US008530031B2

(12) United States Patent
Newrones et al.

(10) Patent No.: US 8,530,031 B2
(45) Date of Patent: Sep. 10, 2013

(54) EVACUATABLE CONTAINER

(76) Inventors: Ronald Newrones, Brecksville, OH (US); Richard L. Sandt, Brunswick, OH (US)

( * ) Notice: Subject to any disclaimer, the term of this patent is extended or adjusted under 35 U.S.C. 154(b) by 47 days.

(21) Appl. No.: 12/906,187

(22) Filed: Oct. 18, 2010

(65) Prior Publication Data

US 2011/0026861 A1 Feb. 3, 2011

Related U.S. Application Data

(62) Division of application No. 11/100,301, filed on Apr. 6, 2005.

(51) Int. Cl.

| | |
|---|---|
| ***B32B 3/24*** | (2006.01) |
| ***B32B 7/12*** | (2006.01) |
| ***B32B 7/14*** | (2006.01) |
| ***B32B 37/12*** | (2006.01) |
| ***B65D 33/01*** | (2006.01) |
| ***B65D 81/34*** | (2006.01) |
| ***B31B 1/84*** | (2006.01) |

(52) U.S. Cl.
USPC ......... 428/137; 428/40.1; 428/41.8; 428/131; 428/134; 428/136; 428/195.1; 428/201; 428/343; 428/354; 426/118; 426/395; 220/89.1; 156/249; 383/100; 383/103

(58) Field of Classification Search
USPC ........................................................ 428/136
See application file for complete search history.

(56) References Cited

U.S. PATENT DOCUMENTS 2,821,338 A * 1/1958 Metzger .......................... 383/94
2,927,722 A * 3/1960 Metzger .......................... 383/94
4,032,679 A * 6/1977 Aoyagi ........................ 428/42.3
4,134,535 A * 1/1979 Barthels et al. ............... 383/102
4,911,563 A * 3/1990 Ciani ............................. 383/89
5,263,777 A * 11/1993 Domke ......................... 383/103
5,584,409 A * 12/1996 Chemberlen ................ 220/89.1
5,989,608 A * 11/1999 Mizuno ......................... 426/113
6,041,533 A * 3/2000 Lemmond, Jr. ................. 40/584
6,210,724 B1 * 4/2001 Clarke et al. .................. 426/118
6,663,284 B2 * 12/2003 Buckingham et al. ........ 383/103
7,051,762 B2 * 5/2006 Haamer ........................ 137/855
2001/0012530 A1 * 8/2001 Hiyoshi ........................ 426/118
2002/0000293 A1 * 1/2002 Hill et al. ................... 156/275.5
2004/0000503 A1 * 1/2004 Shah et al. ................. 206/524.8
2004/0050437 A1 * 3/2004 Engel et al. ................... 137/843
2005/0048261 A1 * 3/2005 Nishii et al. .................. 428/138
2005/0233035 A1 * 10/2005 Smith .......................... 426/118
2006/0030472 A1 * 2/2006 Hartman et al. .............. 493/213

FOREIGN PATENT DOCUMENTS

WO WO 9419045 A1 * 9/1994

OTHER PUBLICATIONS

English Abstract for WO 9419045 A1, Sep. 1994.*

* cited by examiner

*Primary Examiner* — David Sample
*Assistant Examiner* — Jeff Vonch

(57) ABSTRACT

A container (10) having a valve flap (20) which is movable between a closed position, whereat it is seated on the seating area (18) to close an evacuation port (16), and an opened position, whereat it is unseated from the seating area (18) to open the evacuation port (16). A label structure (26) includes a film layer (28) forming a seat platform on which a seating area (18) is located and/or a film layer (30) forming a flap platform on which the valve flap (20) is located. A plurality of label structures (26) can be efficiently and economically mass-produced by a label-manufacturer and then supplied to the container-manufacturer for incorporation into the containers (10).

17 Claims, 14 Drawing Sheets

EVACUATABLE CONTAINER

CROSS REFERENCE TO RELATED APPLICATION

The present application is a division of U.S. patent application Ser. No. 11/100,301 filed Apr. 6, 2005, which is incorporated by reference herein in its entirety.

FIELD OF THE INVENTION

The present invention relates generally, as indicated, to an evacuatable container and, more particularly, to a container having an evacuation port that is opened to remove gas from the container and sealed once gas removal is complete.

BACKGROUND OF THE INVENTION

A container, such as a flexible plastic bag, is often used as a receptacle to contain a commodity. To provide optimum storage conditions for the commodity, it is often desirable for gas (e.g., air) to be removed from the receptacle. If so, the container can include an evacuation port through which gas can pass from the receptacle to the outside environment. Valving can be incorporated into the container to allow the evacuation port to be opened during gas removing steps and closed thereafter to maintain the evacuated condition of the receptacle.

SUMMARY OF THE INVENTION

An evacuatable container includes a label structure providing an openable/closeable valve flap and/or a seating area for such a valve flap. A plurality of the label structures can be efficiently and economically mass-produced separately from the manufacture of the rest of the container and incorporated therewith during latter manufacturing stages. Moreover, the incorporation of the label structure into the container is compatible with conventional container-making and container-filling techniques whereby, quite significantly, this incorporation will not significantly compromise conventional (and typically quick) manufacturing speeds.

More particularly, the container comprises a wall structure defining a receptacle, an evacuation port through which gas can pass from the receptacle to an outside environment, a seating area, and a valve flap. The valve flap has a movable portion which is movable between a closed position whereat it is seated on the seating area to close the evacuation port and an opened position whereat it is unseated from the seating area to open the evacuation port. A seating adhesive, on the seating area, holds the valve flap in the closed position.

A label structure, attached to the wall structure includes a film layer forming a seat platform on which the seating area is located and/or a film layer forming a flap platform on which the valve flap is located. In a first embodiment, the label structure includes both a film layer forming a seat platform on which the seating area is located and a film layer forming a flap platform on which the valve flap is located. In a second embodiment, the valve flap is formed in the wall structure and the label structure includes the film layer forming a seat platform on which the seating area is located. In a third embodiment, the seating area is on the wall structure and the label structure includes the film layer forming a flap platform on which the valve flap is located.

These and other features of the container and/or the label are fully described and particularly pointed out in the claims. The following description and drawings set forth in detail certain illustrative embodiments of the container and/or label which are indicative of but a few of the various ways in which the principles of the invention may be employed.

DETAILED DESCRIPTION OF THE INVENTION

Figure 1:
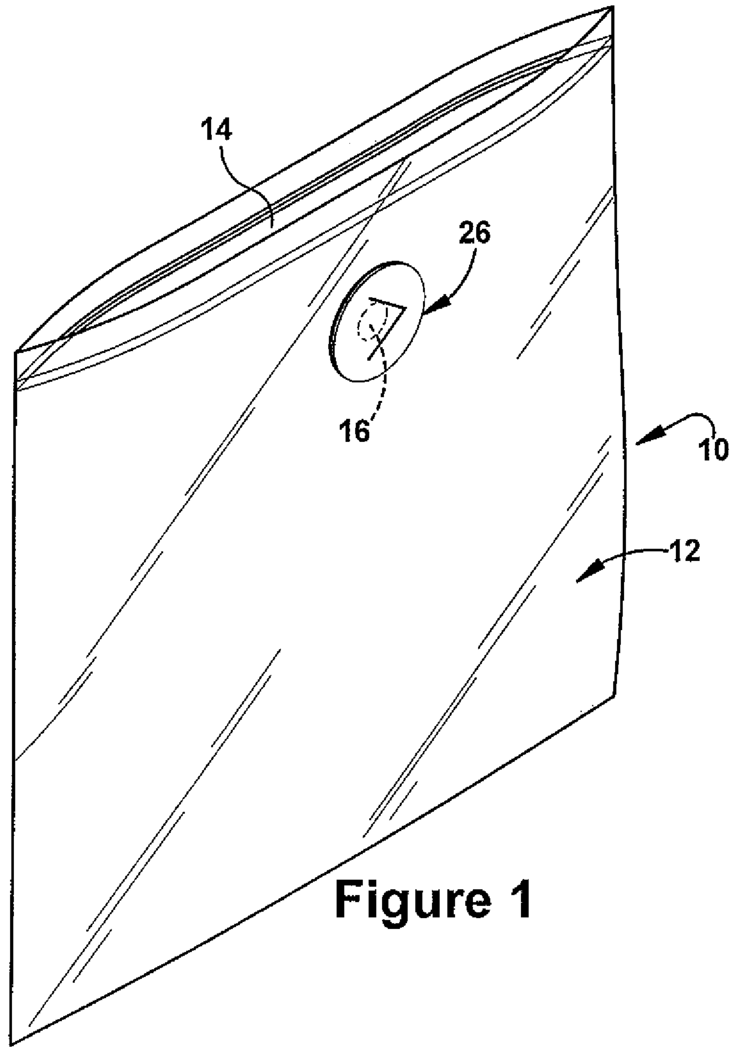
FIG. 1 is a perspective view of a container 10 according to the present invention, the container 10 including a label structure 26 which forms a valving portion of the container 10.

Referring now to the drawings, and initially to FIG. 1, a container 10 according to the present invention is shown. The container 10 comprises a wall structure 12 defining a receptacle 14 for containing a commodity. In the illustrated embodiment, the wall structure 12 has a standard food bag construction comprising flexible plastic panels joined together by side seams, one of which is an openable and closeable seam. However, other wall-structure materials, shapes, sizes, seaming, and/or commodity-holding characteristics are certainly possible with, and contemplated by, the present invention. For example the wall structure 12 can have an industrial bag construction formed from film and/or multi-wall panels.

Figure 2A:
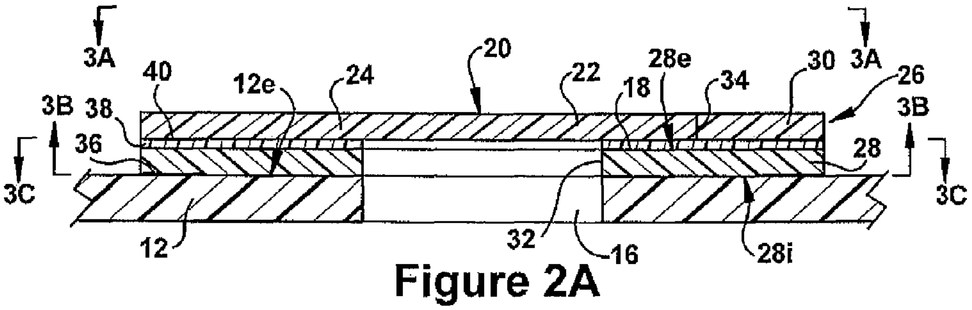
FIGS. 2A and 2B are close-up side views of the valving portion of the container 10, the valving portion being shown with a valve flap in a closed position and an opened position, respectively.
Figure 2B:
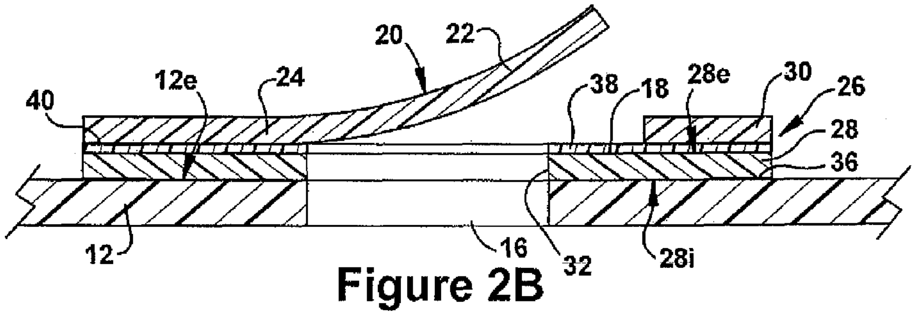

As is best seen by referring additionally to FIGS. 2A and 2B, the container 10 includes an evacuation port 16 in the wall structure 12 through which gas can pass from the receptacle 14 to an outside environment, a seating area 18 adjacent the evacuation port 16, and a valve flap 20. The valve flap 20 includes a movable portion 22 and a hinge portion 24 about which the movable portion 22 pivots. Specifically, the movable portion 22 is movable between a closed position whereat it is seated on the seating area 18 to close the evacuation port 16 (FIG. 2A), and an open position, whereat it is removed from the seating area 18 to open the evacuation port 16 (FIG. 2B).

Figure 3A:
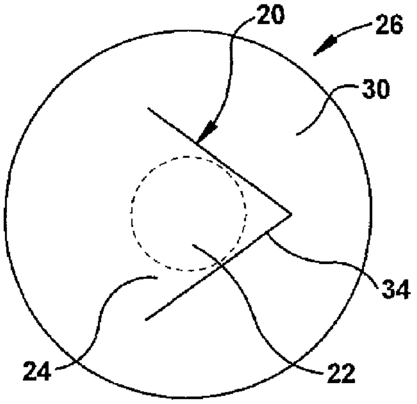
FIGS. 3A and 3B are top and bottom views, respectively, of the label structure 26.
Figure 3B:
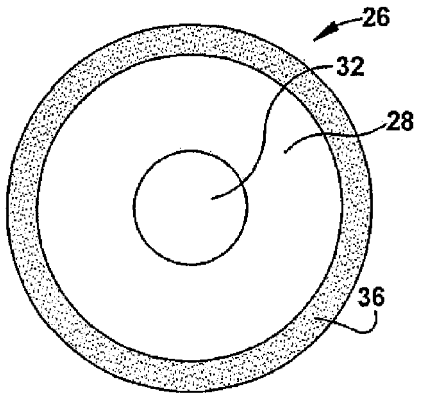

A label structure 26 forms the seating area 18 and the valve flap 20 in the container 10. (FIGS. 1, 2A-2B, and 3A-3C.) The label structure 26 comprises a film layer 28 forming a seat platform on which the seating area 18 is located and a film layer 30 forming a flap platform on which the valve flap 20 is located. (FIGS. 2A-2B and FIGS. 3A-3C.) The film layer 28 includes an opening 32 and the film layer 30 has a cut 34 that defines the valve flap 20. (FIGS. 3A and 3B.)

The label structure 26 additionally comprises a label-to-wall adhesive 36, a seating adhesive 38, and a film-to-film adhesive 40. (FIGS. 2A-2B and FIGS. 3A-3C.) When the label structure 26 is incorporated into the container 10, the label-to-wall adhesive 36 secures the label structure 26 to the exterior surface $\mathbf{12}_e$ of the container's wall structure 12, the seating adhesive 38 holds the movable portion 22 of the valve flap 20 in the closed position, and the film-to-film adhesive 40 secures the film layers 28 and 30 together. (FIGS. 2A-2B.)

Figure 3C:
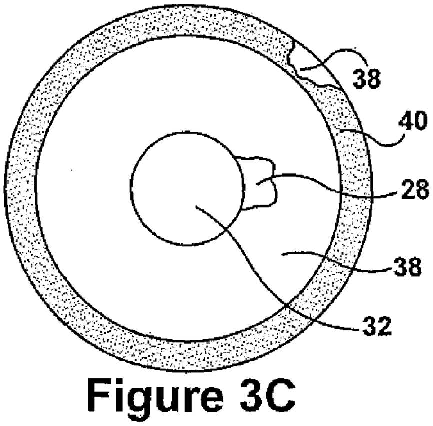
FIG. 3C is a top view of the label structure 26 with a top film layer removed to show the underlying layers.

In the illustrated embodiment, the label-to-wall adhesive 36 is patterned on the interior surface $\mathbf{28}_i$ of the film layer 28 in an annular shape aligned to surround the seating area 18. (FIGS. 2A-2B and FIG. 3B.) The seating adhesive 38 covers the entire exterior surface $\mathbf{28}_e$ of the film layer 28. (FIGS. 2A-2B and FIG. 3C.) The film-to-film adhesive 40 is patterned on the seating adhesive 38 in an annular shape aligned to surround the seating area 18. (FIGS. 2A-2B and FIG. 3C.) The inner perimeter of the seating adhesive 38 and the inner perimeter of the film-to-film adhesive 40 can be generously spaced radially outward from the seating area 18 to eliminate any undesired adhesive-migration into the seating area 18.

Figure 4:
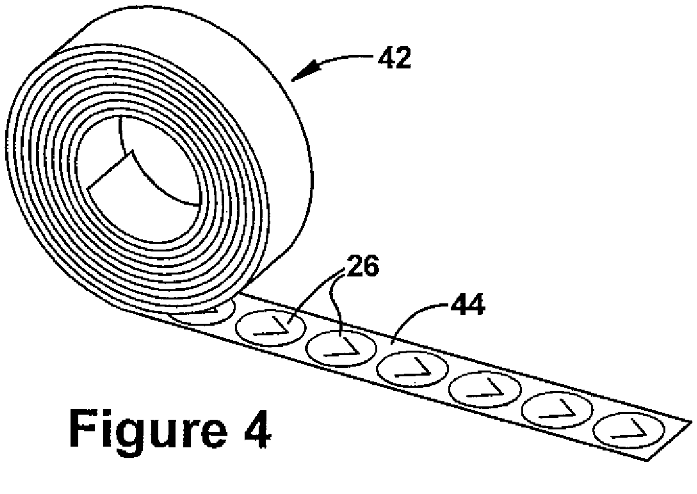
FIG. 4 is a perspective view of a web containing a plurality of the label structures 26.

The label structures 26 can be efficiently and economically mass-produced by a label-manufacturer at a first location and then supplied to the container-manufacturer at a second location for convenient incorporation into the containers 10. For example, as shown in FIG. 4, the label-manufacturer can provide a web 42 comprising a carrier release liner 44 having a plurality of the label structures 26 temporarily attached thereto.

A method of making the web 42 of label structures 26 is shown schematically in FIGS. 5A-5I. It should be noted that in these Figures, the thicknesses of the layers used to create the label structures 26 is greatly exaggerated for ease in illustration and explanation. In actual practice, the film/adhesive layers would much thinner, specifically, for example, in the range of 1 mm or less.

Figure 5A:
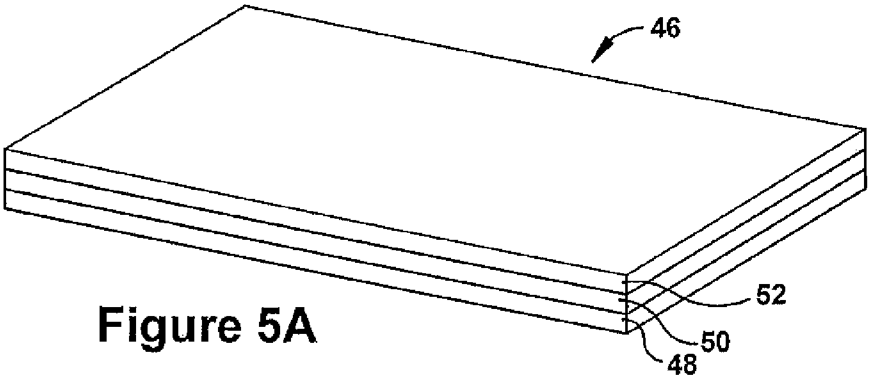
FIGS. 5A-5I are schematic views of a method of making a plurality of the label structures 26.
Figure 5B:
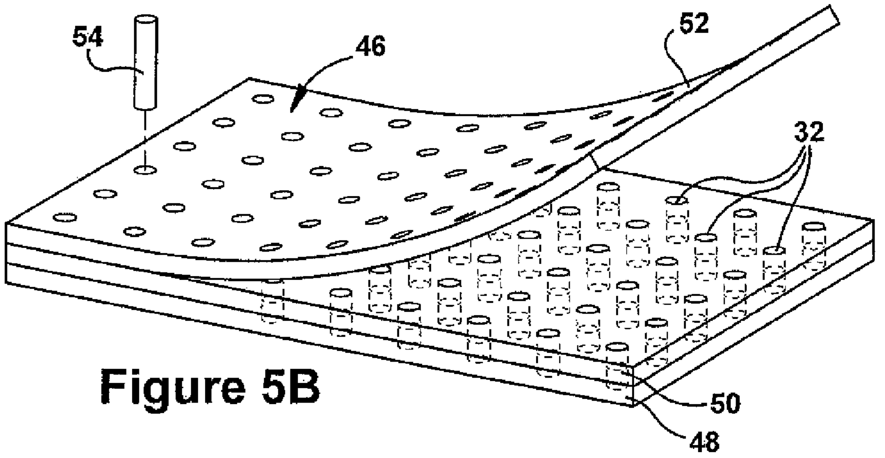

In the illustrated label-making method, a laminate 46 is provided that comprises a film layer 48 (corresponding to the seating platform film layer 28 in the label structure 26), an adhesive layer 50 (corresponding to the seating adhesive layer 38 in the label structure 26), and a release liner 52. (FIG. 5A.) The laminate 46 can be manufactured at another location and supplied to the label-manufacturer in its compiled form. Alternatively, the layers 48/50/52 can be compiled by the label-manufacturer upstream and/or in-line with subsequent label-production steps. In either case, openings 32 are punched through the laminate 46 and thereafter the release liner 52 and the slugs 54 (from the openings 32) are removed. (FIG. 5B.)

Figure 5C:
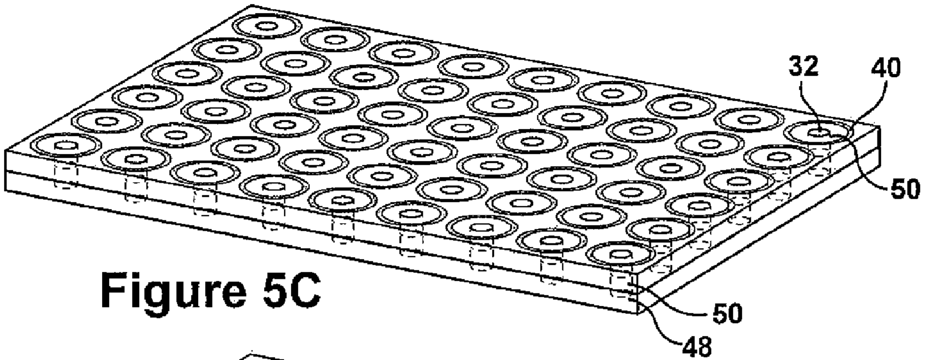
Figure 5D:
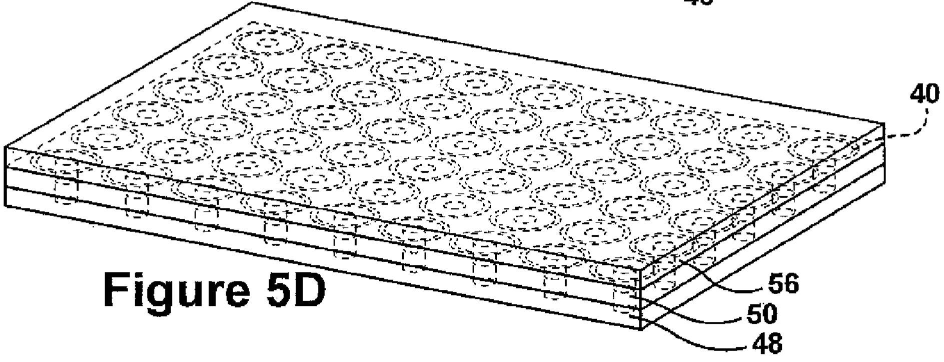
Figure 5E:
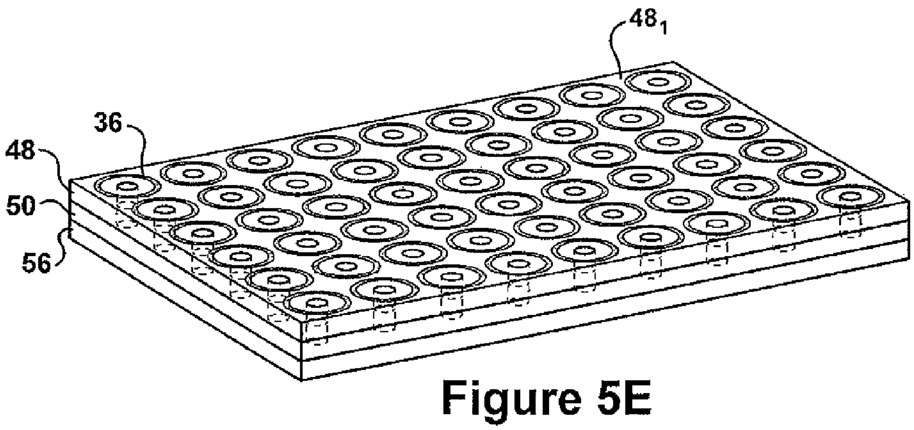

The film-to-film adhesive 40 is then printed in a pattern over the now-exposed adhesive layer 50. (FIG. 5C.) A film layer 56 (corresponding to the film flap layer 30) is placed over the adhesive layer 50 and secured thereto by the printed film-to-film adhesive 40. (FIG. 5D.) The label-to-wall adhesive layers 36 are then printed on the first surface $\mathbf{48}_1$ of the film layer 48. (FIG. 5E.) (A flipping or turning of the compiled layers 48/50 may be necessary prior to this printing step.) It may be noted that the earlier formation of the openings 32 allows these openings to be used for registration purposes when printing the annular adhesive patterns with the label-to-wall 36 and film-to-film 40 adhesives.

Figure 5F:
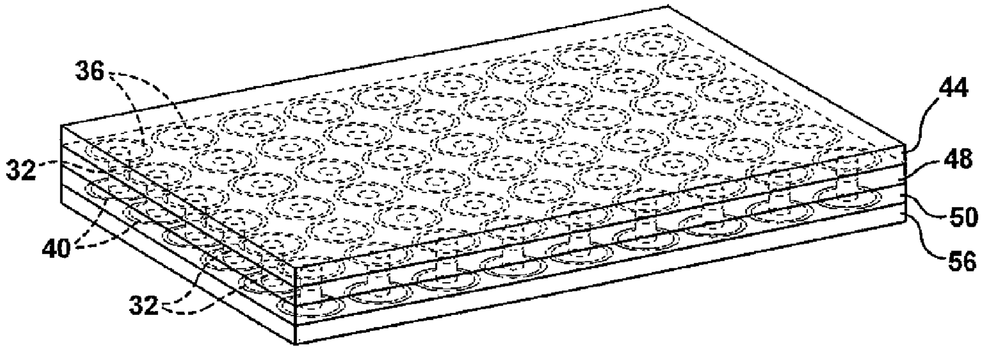
Figure 5G:
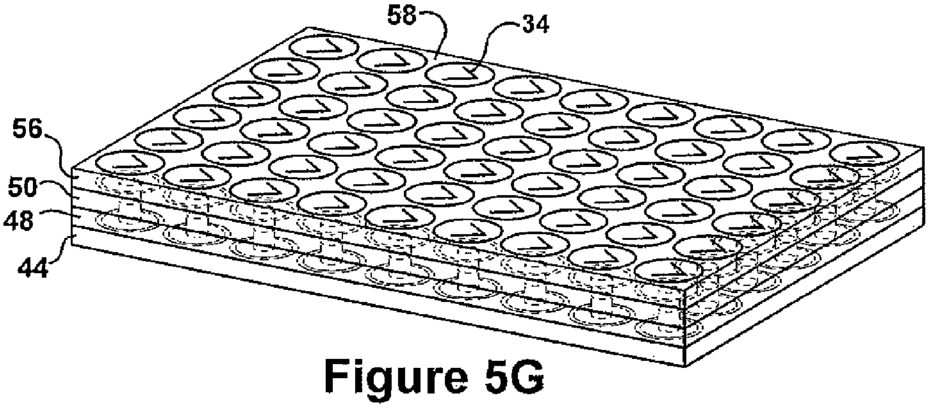

The carrier release liner 44 (i.e., the carrier layer for the web 42) is then placed over the adhesive-printed first surface $\mathbf{48}_1$ of the film layer 48, and temporarily secured thereto by the label-to-wall adhesive printed patterns 36. (FIG. 5F.) Thereafter, the overall label shape (e.g., circular) is die cut through the film layers 48 and 56, but not the carrier release liner 44. (FIG. 5G.) In the illustrated embodiment, the flap-defining cuts 34 are formed in the film layer 56 (but not the film layer 48 and not the carrier release liner 44) during the die-cutting step (FIG. 5G). However, this flap-forming step could instead be performed downstream of the die-cutting step or upstream of the die cutting step (e.g., before the compiling step, before the adhesive-printing step, etc.).

Figure 5H:
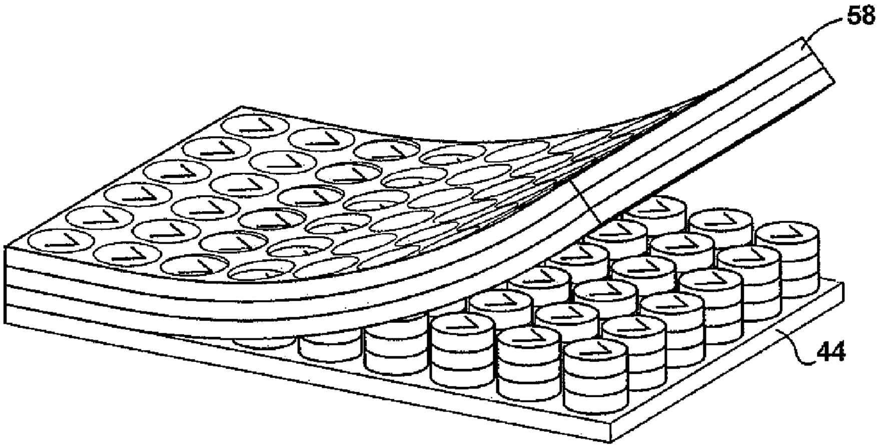
Figure 5I:
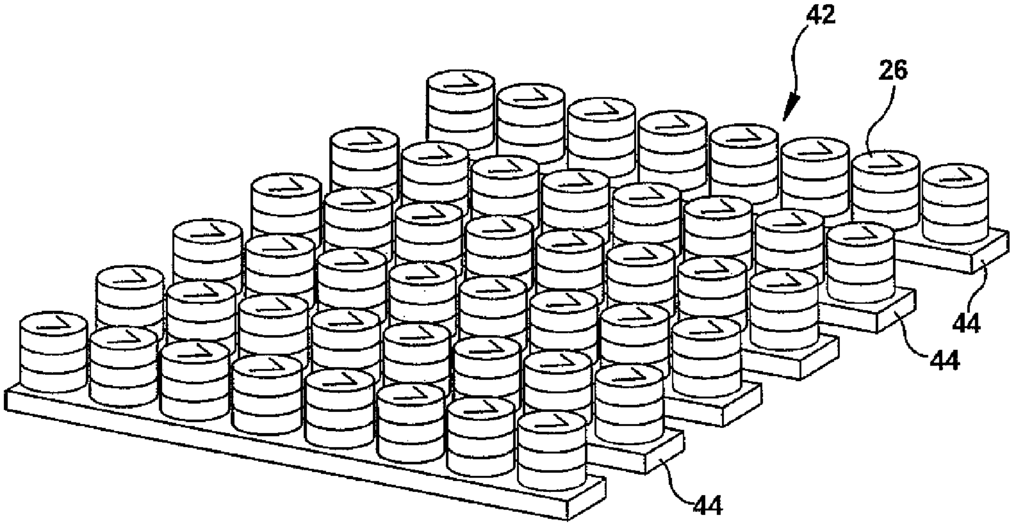

Thereafter, if desired, the surrounding matrix 58 can be removed and/or the product divided into single-row webs 42. (FIGS. 5H and 5I.)

Figure 6A:
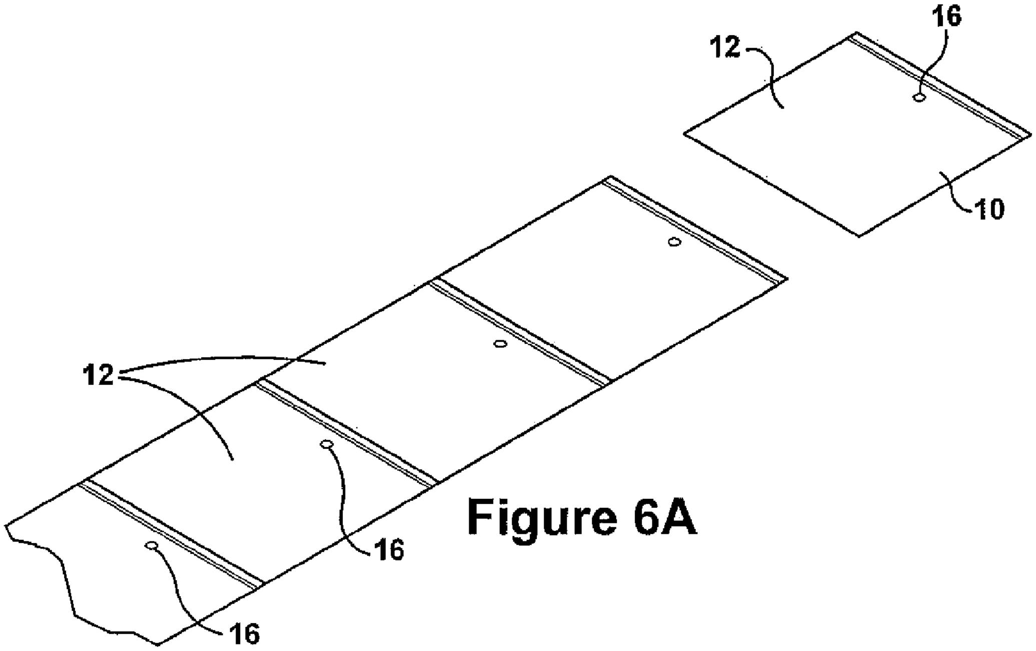
FIGS. 6A and 6B are schematic views of a method of incorporating the label structures 26 into containers 10.
Figure 6B:
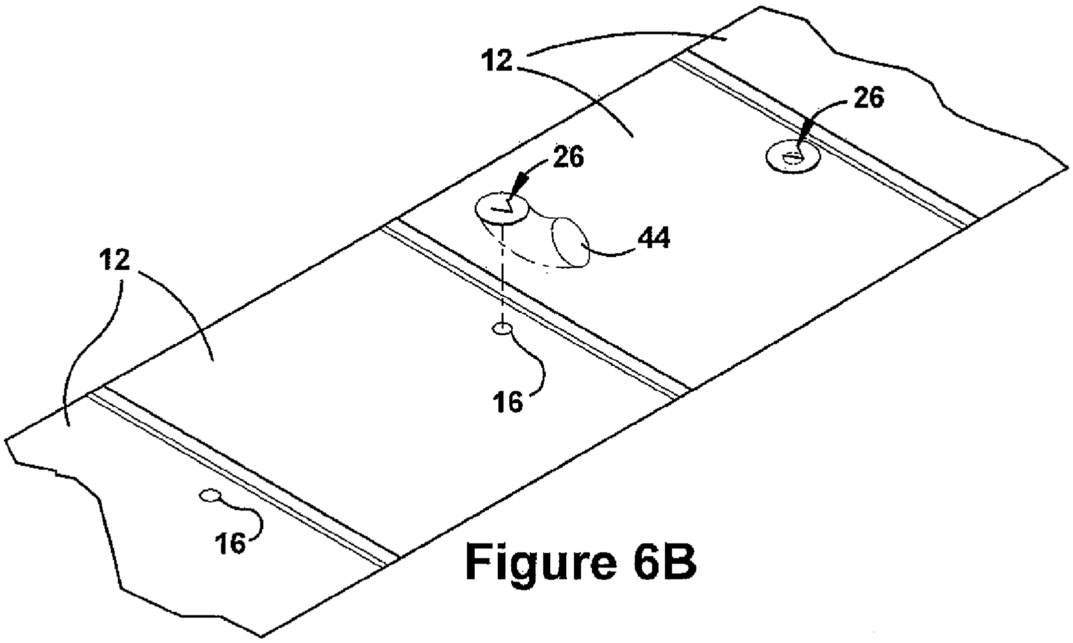

The wall structures 12 of the containers 10 can be separately mass-manufactured in a continuous strip wherein, for example, the bottom seam of one wall structure 12 abuts against the top seam of the adjacent downstream wall structure 12. (FIG. 6A). Before, after, or during creation of the wall structure 12, the evacuation port 16 can be cut or otherwise formed in the wall structure 12. The label structures 26 can be removed from the carrier release liner 44, aligned with the ports 16 and secured to the wall structures 12 (FIG. 6B). The removal, aligning, and securing step can be performed automatically (i.e., by a machine, not shown) or can be performed manually (i.e., by a person, not shown). The wall structures 12 can be separated from each other by a severing device (not shown), either before or after the label-securing step.

Figure 7A:
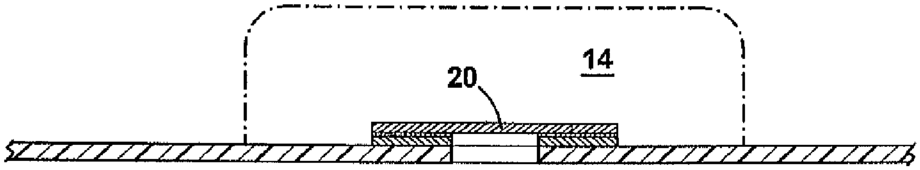
FIGS. 7A-7F are schematic views of various ways of opening/closing the valve flap 20 of the container 10.
Figure 7B:
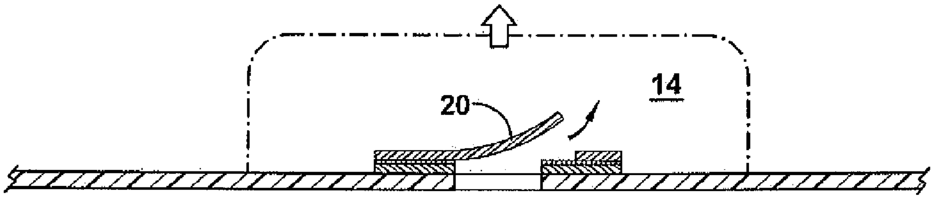
Figure 7C:
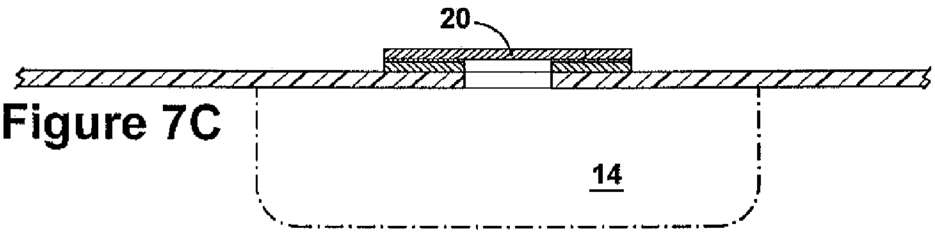
Figure 7D:
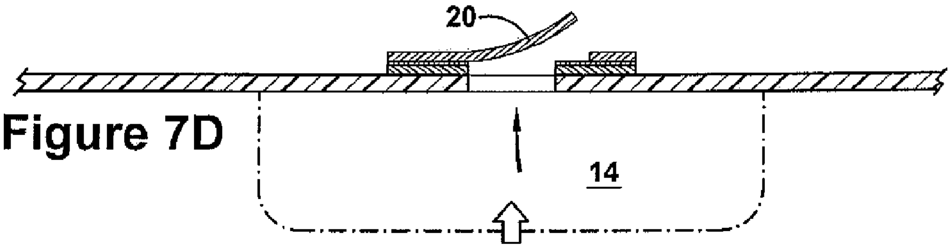

The label structure 26 allows gas to be selectively removed from the receptacle 14 of the container 10 to provide optimum storage conditions for a commodity stored therein. For example, forces outside the receptacle 14 can be used to pull the flap 20 to the opened position (FIGS. 7A and 7B) and/or pressure from inside the receptacle 14 can push the valve flap 20 to the opened position. (FIGS. 7C and 7D.) The pressure from inside the receptacle 14 can be result of the commodity/gas therein expanding to a great volume and/or from the receptacle 14 being compressed to a smaller volume. For example, with an industrial-bag-construction, a weight or flattening device could be applied to the wall structure 12 to cause a rise of pressure within the receptacle 14.

Figure 7E:
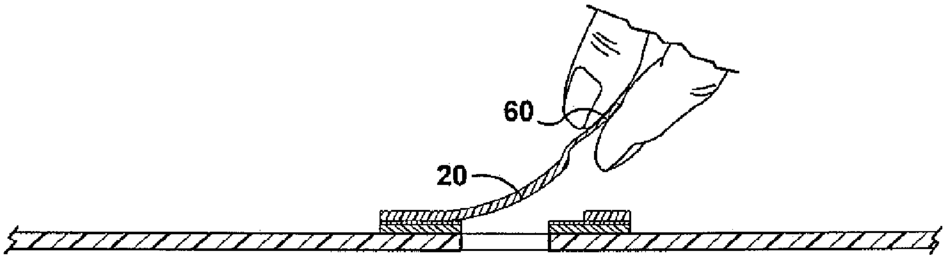

Alternatively, the valve flap 20 can be manually or otherwise placed in the opened position prior to the relevant force being imposed on the receptacle 14. (FIG. 7E.) The valve flap 20 can be designed to have sufficient resiliency to return to the closed position upon removal of the relevant force, or the valve flap 20 can be pushed, manually or otherwise, back to its closed position. (FIG. 7E.) If the valve flap 20 is to be manually placed in the opened position and/or the closed position, it can include a finger tab 60 for easier manipulation. (FIG. 7E.)

Figure 7F:
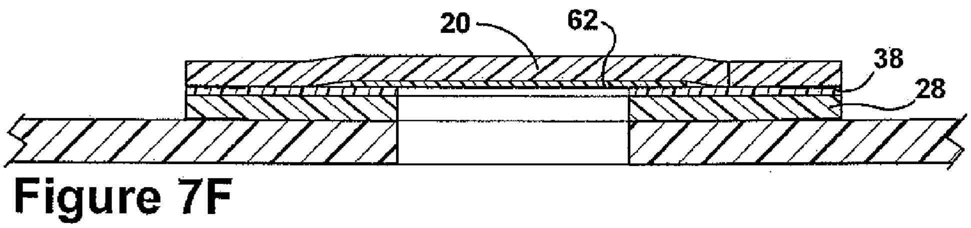

In certain circumstances, it may be desirable for the valve flap 20 to be re-opened after a post-evacuation closure, while in other circumstances, a permanent post-evacuation closure may be preferred. If re-opening of the valve flap 20 is desired, the seating adhesive 38 can be a resealable pressure-sensitive adhesive. If re-opening is not desired, the seating adhesive 38 can be a permanent adhesive, with a release-liner tab 62 temporarily placed over the flap-region of the seating adhesive 38. (FIG. 7F.) Alternatively, permanent closure can be accomplished by the seating adhesive 38 being an energy-activated adhesive (e.g., a heat-activated adhesive) which is activated after evacuation.

Figure 8A:
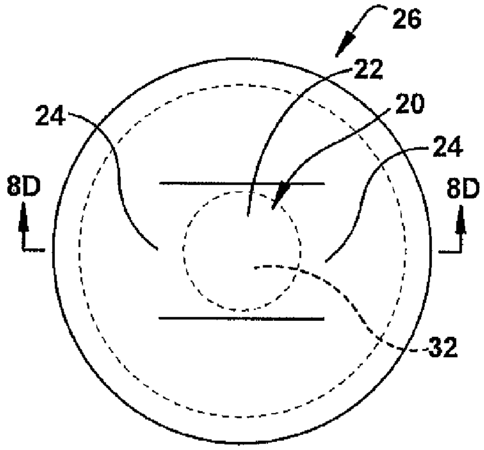
FIGS. 8A-8C are top views of label structures 26 with modified valve flap designs.
Figure 8B:
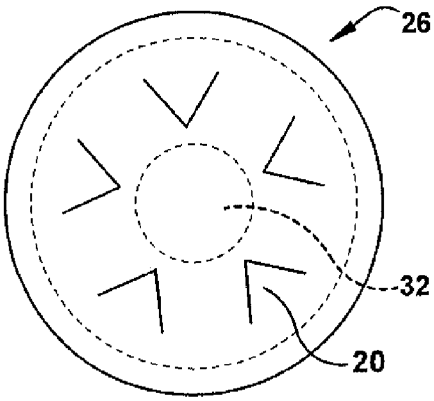
Figure 8C:
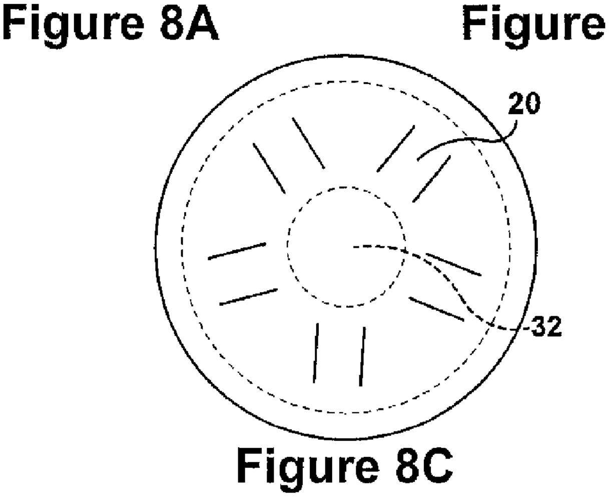
Figure 8D:
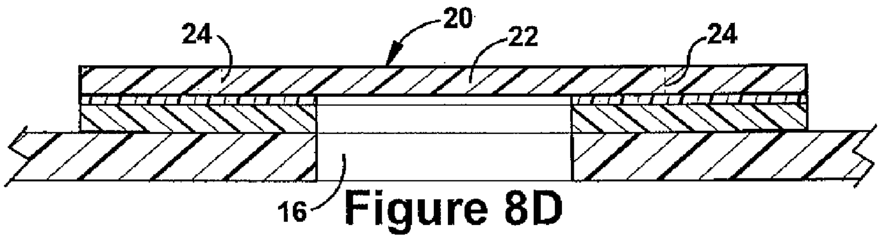
FIGS. 8D and 8E are close-up side views of the label structure 26 of FIG. 8A incorporated into a container 10, the valve flap being shown in a closed position and an opened position, respectively.
Figure 8E:
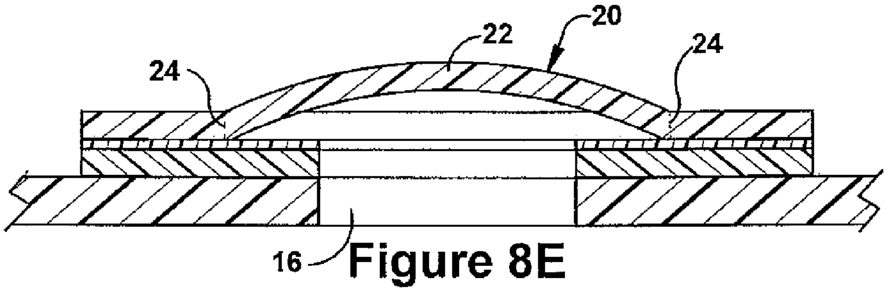

The container 10 can, as shown, have a single valve flap 20 for its seating area 18 and this valve flap 20 can have a single hinge portion 24 connecting its movable portion 22 to the wall structure 12. However, the valve flap 20 can instead comprise two hinge portions 24 on opposite sides of the movable portion 22 as is shown in FIG. 8A. Additionally or alternatively, the container 10 can comprise a plurality of valve flaps 20 for each seating area 18 as shown in FIGS. 8B and 8C. With particular reference to the valve flap design shown in FIGS. 8A and 8C, the hinge portions 24 allow the movable portion 22 of the valve flap 20 to lift away from the rest of the film layer 30 (e.g., "pucker up") to allow gas to exit. (See FIGS. 8D and 8E.) In any event, any combination of movable portion(s) 22 and hinge portion(s) 24 which allow the flap(s) 20 to move between the closed position and the opened position is possible with, and contemplated by, the present invention.

Figure 9A:
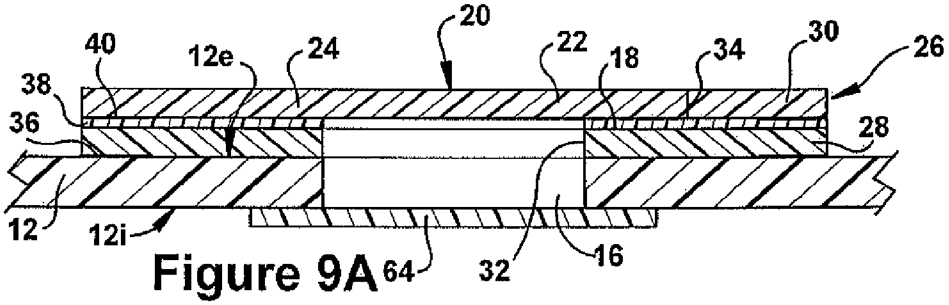
FIGS. 9A-9E are close-up side views similar to FIG. 2A, except that a vent layer has been incorporated into the container 10 and/or the label structure 26.
Figure 9B:
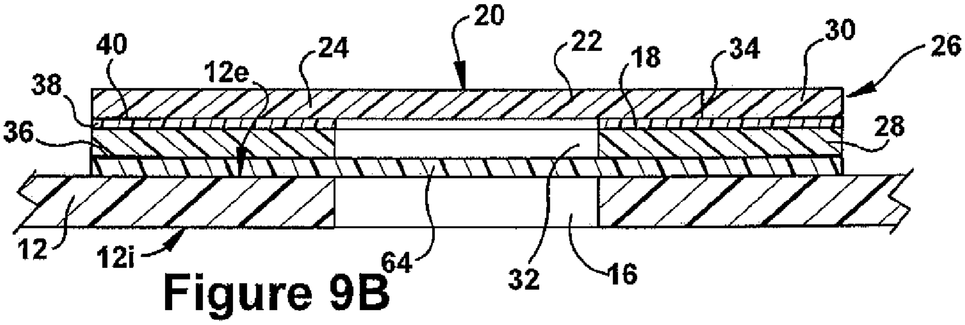
Figure 9C:
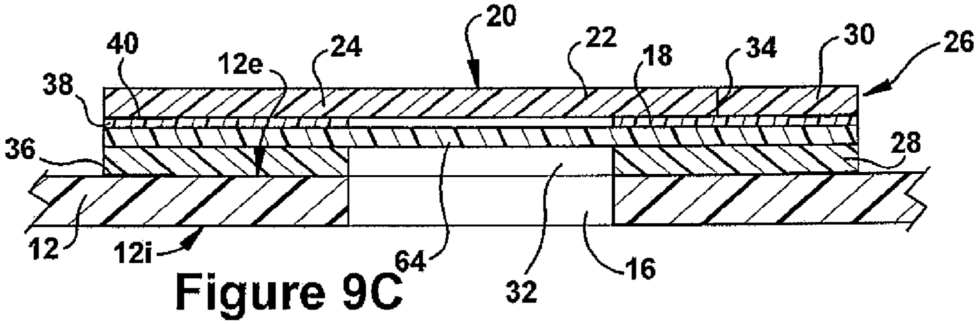
Figure 9D:
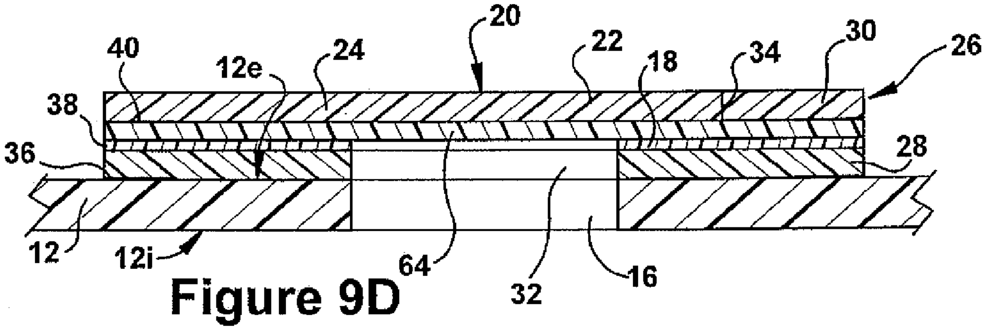
Figure 9E:
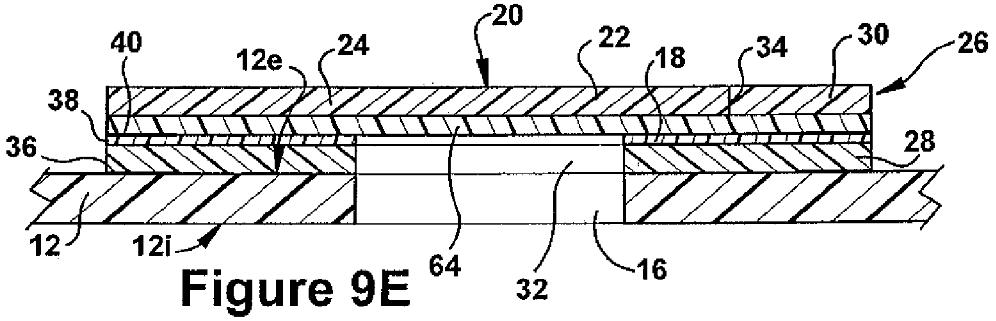

In certain situations, it may be desirable for the valving of the container 10 to prevent liquids (or powders) from exiting the receptacle 14 via the evacuation port 16. If so, it may be desirable to include a vent layer 64 which is pervious with respect to the expected gasses while, at the same time, it is substantially impervious to the expected liquids (or powders). The vent layer 64 can be positioned on the interior surface $12_i$ of the wall structure 12 (FIG. 9A), on the exterior surface $12_e$ of the wall structure 12 (FIG. 9B), and/or between the film layer 28 and the seating adhesive 38 (FIG. 9C).

Figure 10A:
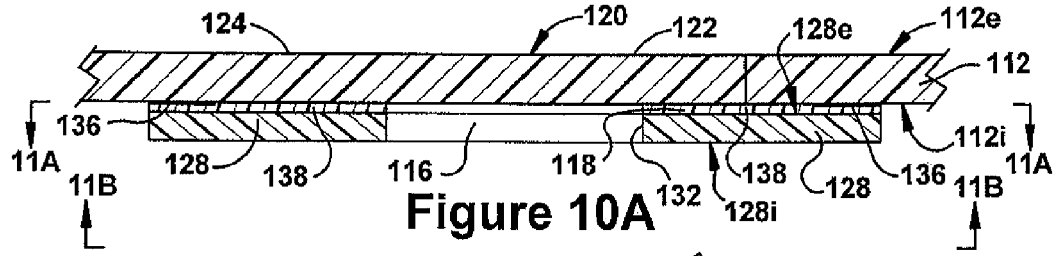
FIGS. 10A and 10B are close-up side views of the valving portion of a container 110, the valving portion being shown with a valve flap in a closed position and an opened position, respectively.
Figure 10B:
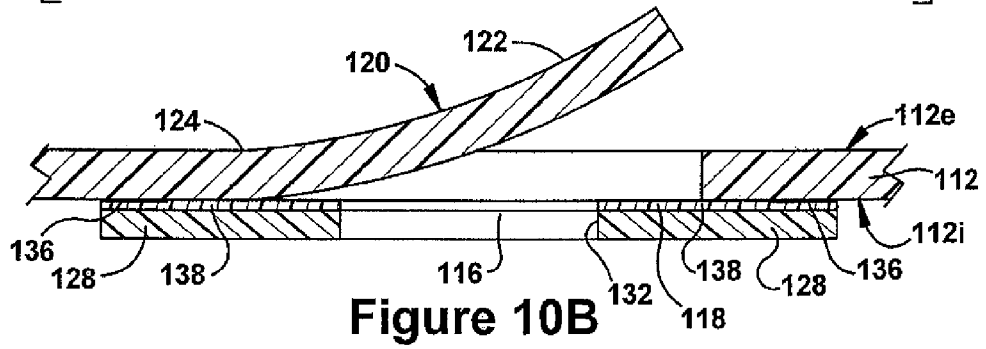

Referring now to FIGS. 10A and 10B, another container 110 according to the present invention includes an evacuation port 116 in its wall structure 112, a seating area 118 adjacent to the evacuation port 116, and a valve flap 120. The valve flap 120 includes a movable portion 122 and a hinge portion 124 about which the movable portion 122 pivots. The valve flap 120 is formed (e.g., cut) in the wall structure 112 and the evacuation port 116 is the opening defined by the flap 120.

Figure 11A:
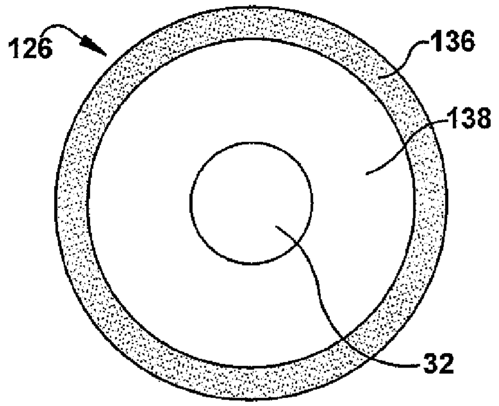
FIGS. 11A and 11B are top and bottom views, respectively, of a label structure 126 which forms a valving portion of the container 110.
Figure 11B:
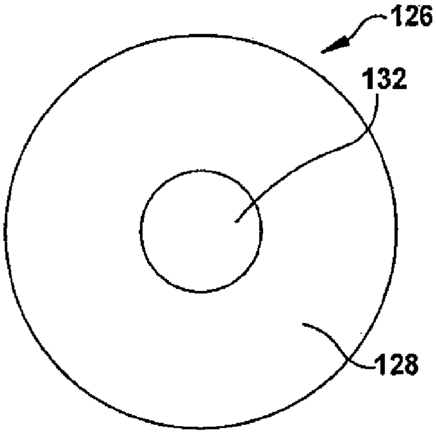

As is best seen by referring additionally to FIGS. 11A-11B, a label structure 126 forms the seating area 118. The label structure 126 comprises a film layer 128, forming a seat platform on which the seating area 118 is located, a label-to-wall adhesive layer 136 and a seating adhesive layer 138. When the label structure 126 is incorporated into the container 110, the label-to-wall adhesive layer 136 secures the label structure 126 to the interior surface $112_i$ of the container's wall structure 112 and the seating adhesive 138 holds the movable portion 122 of the valve flap 120 in the closed position. In the illustrated embodiment, the seating adhesive layer 138 covers the exterior surface $128_e$ of the film layer 128 and the label-to-wall adhesive layer 136 is patterned on the adhesive layer 138 in annular shape that is aligned to surround the seating area 118. Preferably, the inner perimeter of the label-to-wall adhesive layer 136 is generously spaced radially outward from the seating area 118 to avoid adhesive migration issues.

Figure 12:
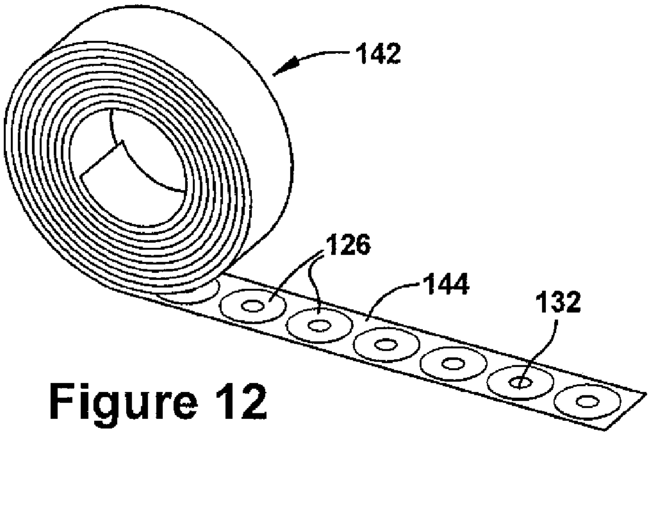
FIG. 12 is a perspective view of a web containing a plurality of the label structures 126.
Figure 13A:
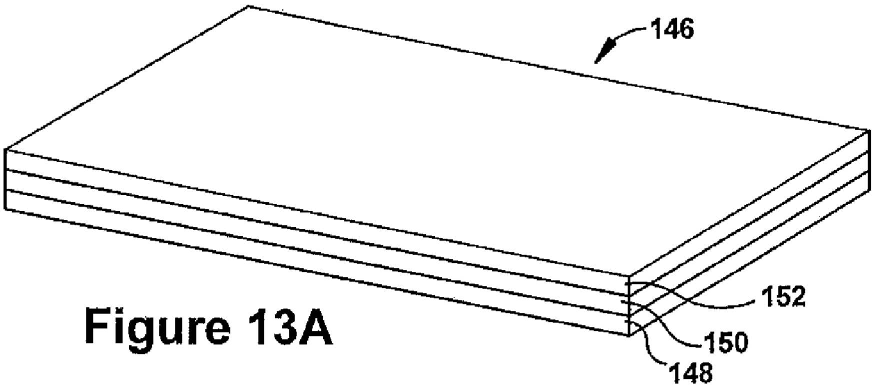
FIGS. 13A-13G are schematic views of a method of making a plurality of the label structures 126.
Figure 13B:
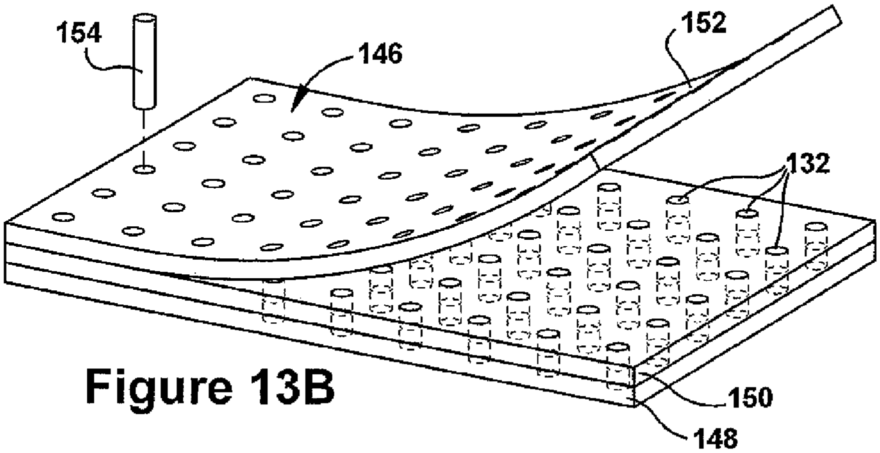
Figure 13C:
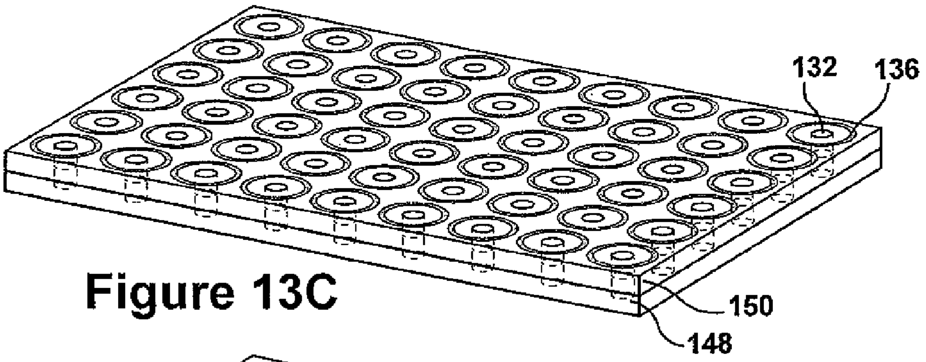
Figure 13D:
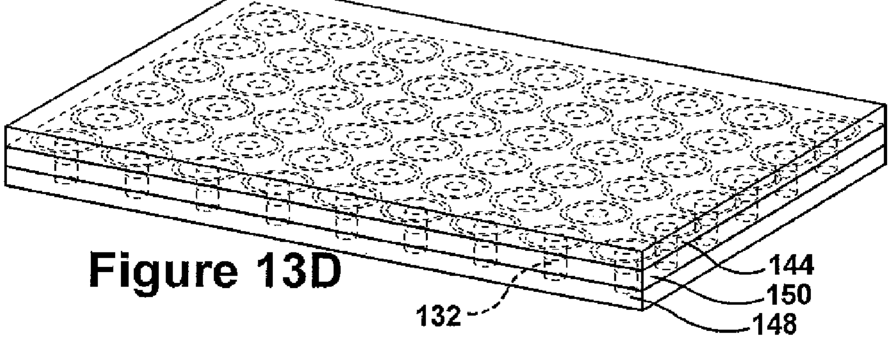
Figure 13E:
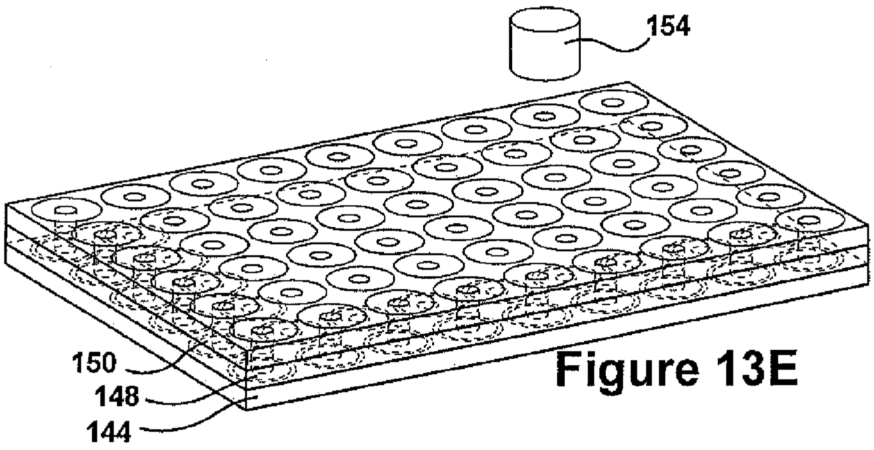
Figure 13F:
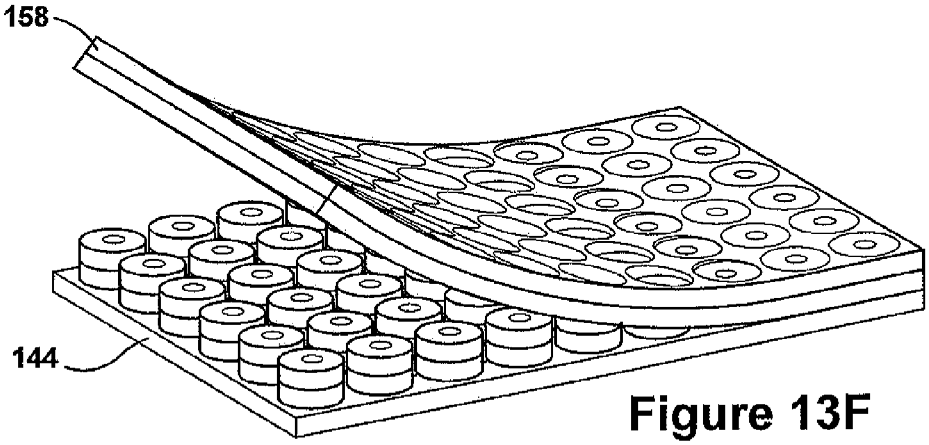
Figure 13G:
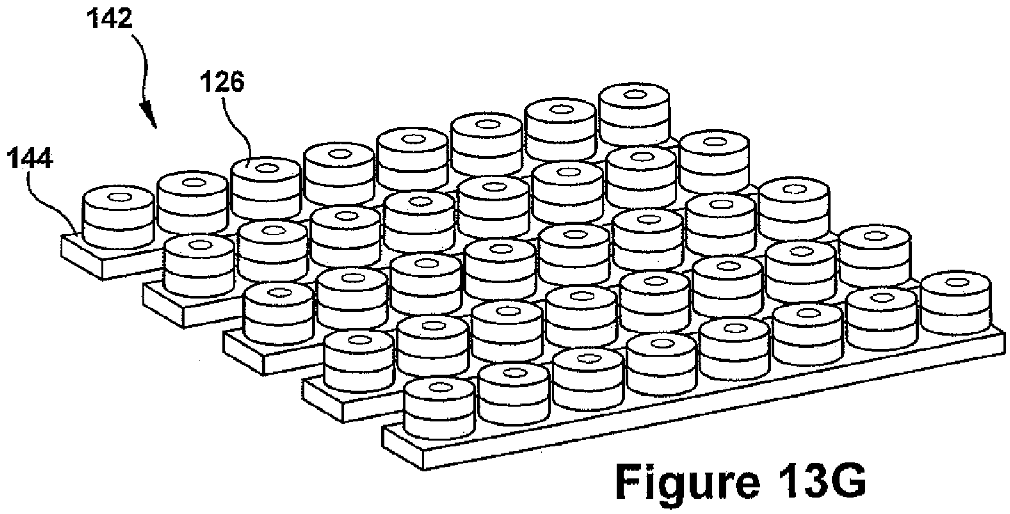

The label-manufacturer can provide a web 142 comprising a plurality of label structures 126 temporarily attached to a carrier release liner 144. (See FIG. 12.) The web 142 can be made by first providing a laminate 146 comprising a film layer 148 (corresponding to the seating platform layer 128 in the structure 126), an adhesive layer 150 (corresponding to the seating adhesive layer 138 in the structure 126), and a release liner 152. (FIG. 13A.) The openings 132 are punched through the laminate 146 and thereafter the release liner 152 and the slugs 154 are removed. (FIG. 13B.) The label-to-wall adhesive layer 136 is then printed in an annular pattern over the now-exposed adhesive layer 150. (FIG. 13C). The release liner 144 (i.e., the carrier layer for the web 142) is then placed over the adhesive-printed surface $148_1$ of the film layer 148, and temporarily secured thereto by the label-to-wall adhesive printed patterns 136. (FIG. 13D.) Thereafter, the overall label shape (e.g., circular) is then die cut through the film layer 148 (but not the carrier release liner 144). (FIG. 13E.) Thereafter the surrounding matrix 158 can be removed and/or the sheet divided into single-row webs 142. (FIGS. 13F and 13G.) (Again, the thicknesses of the film and adhesive layers are greatly exaggerated for the ease in illustration and explanation.)

The wall structures 112 of the containers 110 can be separately mass-manufactured and the label structures 126 can be removed from the carrier release liner 144, aligned with the ports 116 and secured to the wall structures 112. (See FIGS. 6A and 6B, above.) In this embodiment of the invention, however, the label structures 126 are secured on the inside of the container 110, whereby it may be more advantageous to secure the label structures 126 to the evacuation ports 116 during an intermediate stage of the manufacture of the containers 110. For example, the label structures 126 could be secured while the wall-structure material is still in sheet form and/or the seams have not yet been sealed.

As with the container 10, a force outside the container 110 can pull the flap 120 open, a pressure force from within the container 110 can push the flap 120 open, the valve flap 120 can be manually opened/closed. The seating adhesive 138 can be a resealable pressure-sensitive adhesive, a permanent pressure-sensitive adhesive, or a heat-activated adhesive. (See FIGS. 7A-7F, above.) The container 110 can have a single valve flap 120, a plurality of valve flaps 120, a single-hinge flap design and/or a double-hinge flap design. (See FIGS. 8A-8C, above.) The container 110 and/or the label structure 126 can include a vent layer 64 positioned, for example, on the exterior surface $112_e$ of the wall structure 112 and/or between the film layer 128 and the seating adhesive 138. (See FIGS. 9A-9C.)

Figure 14A:
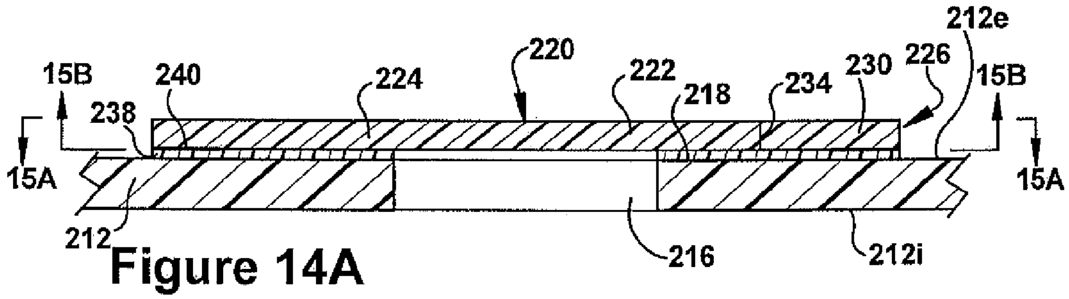
FIGS. 14A and 14B are close-up side views of the valving portion of a container 210, the valving portion being shown with a valve flap in a closed position and an opened position, respectively.
Figure 14B:
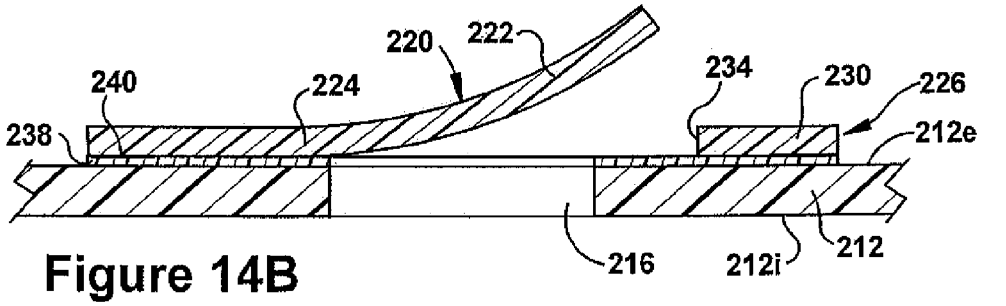

Referring now to FIGS. 14A and 14B, another container 210 according to the present invention includes an evacuation port 216 in its wall structure 212, a seating area 218 adjacent the evacuation port 216, and a valve flap 220. The valve flap 220 includes a movable portion 222 and a hinge portion 224 about which the movable portion 222 pivots. In this embodiment of the invention, the seating area 218 is a region of the wall structure 212 surrounding the evacuation port 216 and the seating adhesive 238 is printed thereupon.

Figure 15A:
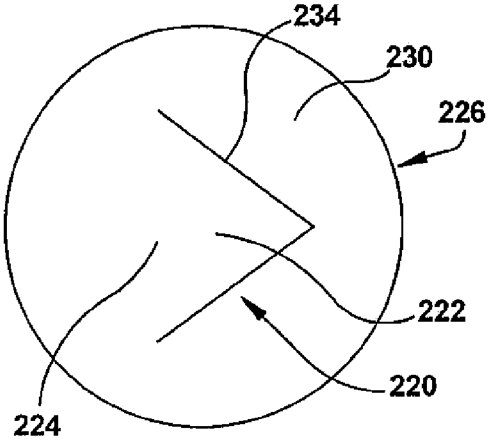
FIGS. 15A and 15B are top and bottom views, respectively, of a label structure 226 which forms a valving portion of the container 210.
Figure 15B:
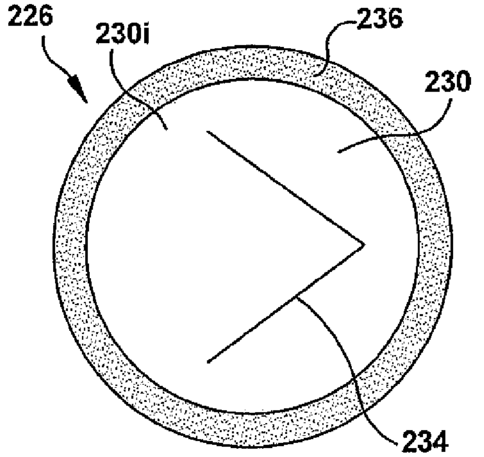

As is best seen by referring additionally to FIGS. 15A and 15B, a label structure 226 forms the valve flap 220. Specifically, the label structure 226 comprises a film layer 230 forming a flap platform on which the valve flap 220 is located (e.g., formed by flap-defining cut 234). The label structure 226 additionally comprises a label-to-wall adhesive layer 236 which, when the label structure 226 is incorporated into the container 210, secures the label structure 226 to the exterior surface $\mathbf{212}_e$ of the wall structure 212. The label-to-wall adhesive layer 236 is patterned on interior surface 230$_i$ of the film layer 230 in an annular shape aligned to surround the seating area 218. Again, the inner perimeter of the label-to-wall adhesive layer 236 is preferably generously spaced radially outward from the seating area 218 to avoid adhesive migration issues.

Figure 16:
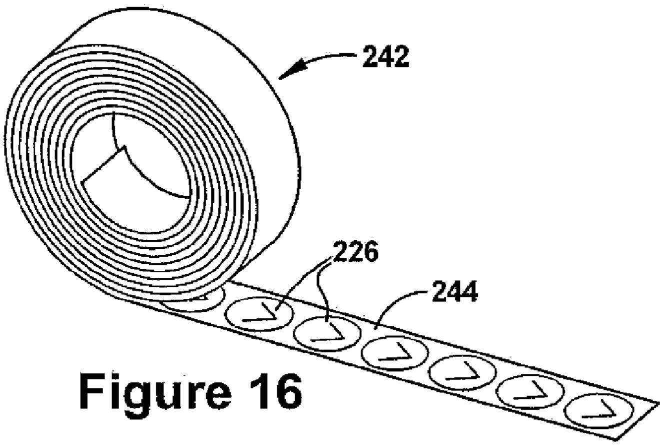
FIG. 16 is a perspective view of a web containing a plurality of the label structures 226.
Figure 17A:
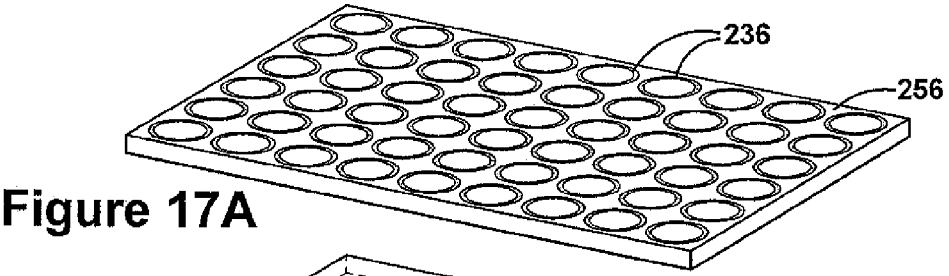
FIGS. 17A-17E are schematic views of a method of making a plurality of the label structures 226.
Figure 17B:
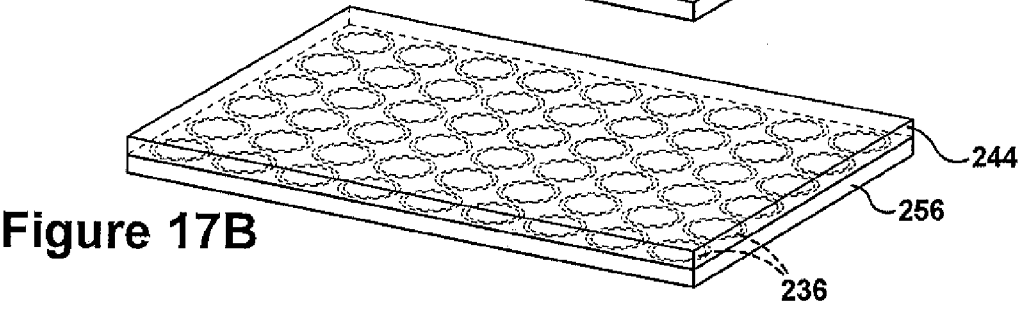
Figure 17C:
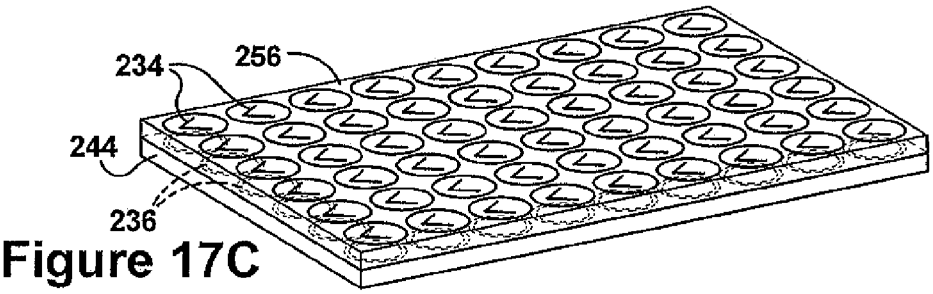
Figure 17D:
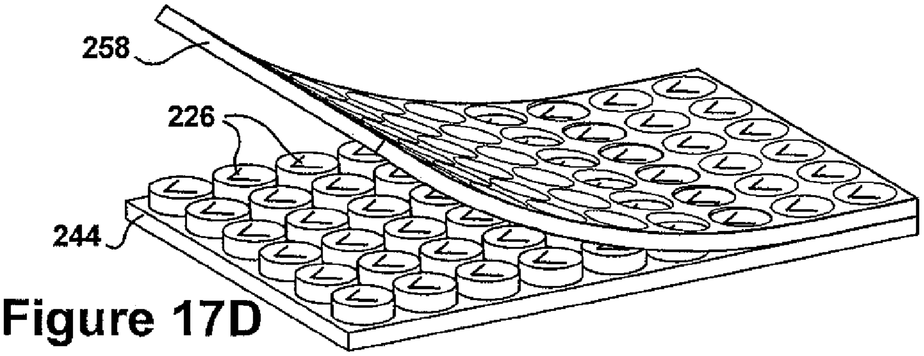
Figure 17E:
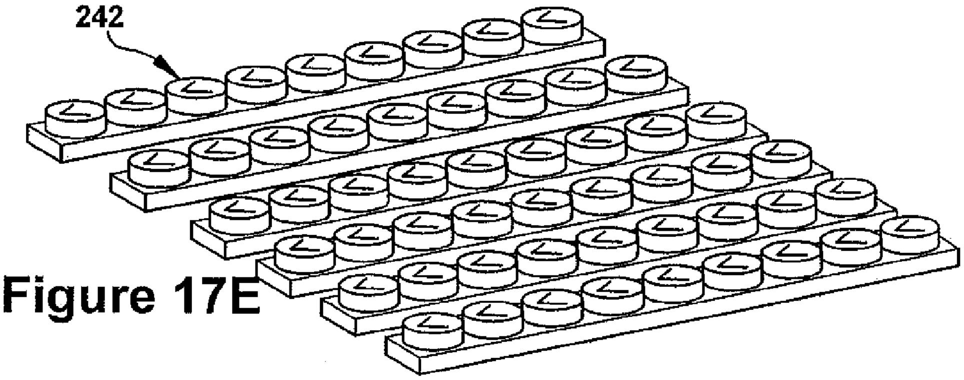

The label-manufacturer can provide a web 242 comprising a plurality of label structures 226 temporarily attached to a release liner 244. (See FIG. 16.) The web 242 can be made by first providing a film layer 256 (corresponding to the flap platform 230) and printing the label-to-wall adhesive 236 thereon. (FIG. 17A.) The release liner 244 (e.g., the carrier layer for the web 242) is then placed over the printed surface of the film layer 256 and temporarily secured thereto by the label-to-wall adhesive layer 236. (FIG. 17B.) Thereafter, the overall shape of the label structures 226 (e.g., round) is die cut through the film layer 256 (but not the release liner 244) and the flap-defining cuts 234 are also formed therein. (FIG. 17C.) The surrounding matrix 258 can be removed and/or the sheet divided into single-row webs 242. (FIGS. 17D and 17E.) (Again, the thicknesses of the film and adhesive layers are greatly exaggerated for the ease in illustration and explanation.)

The wall structures 212 of the containers 210 can be separately mass-manufactured and the label structures 226 can be removed from the release liner 244, aligned with the evacuation ports 216 and secured to the wall structures 212. (See FIGS. 6A and 6B, above.) In this embodiment of the invention, the container-manufacturer would need to apply the seating adhesive 238 to the wall structure 212 at some point in the production process prior to the incorporation of the label structures 226.

As with the container 10 and the container 110, a force outside the container 210 can pull the flap 220 open, a pressure force from within the container 210 can push the flap 220 open, the valve flap 220 can be manually opened/closed. (See FIGS. 7A-7E.) The seating adhesive 238 can be a resealable pressure-sensitive adhesive, a permanent pressure-sensitive adhesive, or a heat-activated adhesive. The container 210 can have a single valve flap 220, a plurality of valve flaps 220, a single-hinge flap design and/or a double-hinge flap design. (See FIGS. 8A-8C.) The container 210 and/or the label structure 226 can include a vent layer 64 positioned, for example, on the interior surface 212$_i$ of the wall structure 212. (See FIG. 9A.)

As was alluded to above, the container wall structures 12/112/212 can be thermoplastic material or a blend of thermoplastic materials. For example, the wall structures 12/112/212 could comprise polyolefins such as high density polyethylene (HDPE), low density polyethylene (LDPE), linear low density polyethylene (LLDPE), and polypropylene (PP); thermoplastic elastomers such as styrenic block copolymers, polyolefin blends, elastomeric alloys, thermoplastic polyurethanes, thermoplastic copolyesters and thermoplastic polyamides; polymers and copolymers of polyvinyl chloride (PVC); polyvinylidene chloride (PVDC); saran polymers; ethylene/vinyl acetate copolymers; cellulose acetates; polyethylene terephthalate (PET); ionomer (Surlyn); polystyrene; polycarbonates; styrene acrylonitrile; aromatic polyesters; linear polyesters; and thermoplastic polyvinyl alcohols. The wall structures 12/112/212 could instead comprise non-thermoplastic, non-plastic materials, and/or any other materials which allow for selective evacuation of gas within the receptacle 14/114/214.

The film layer 28/128 (and thus also the film layers 48/148) and the film layer 30/230 (and thus also the film layers 56/256) can be made from polymer film materials such as polystyrenes, polyolefins, polyamides, polyesters, polycarbonates, polyvinyl alcohol, poly(ethylene vinyl alcohol), polyurethanes, polyacrylates including copolymers of olefins such as ethylene and propylene with acrylic acids and esters, copolymers of olefins and vinyl acetate, ionomers and mixtures thereof. With particular reference to the film layer 30/230 (and film flap layers 56/256), the material must be such that the valve flap 20/120/220 is capable of moving between the closed position and the open position in the intended manner. The finger tab 60 can be made of the same, similar and/or other material.

The label-to-wall adhesive 36/136/236 can be any suitable adhesive, such as a pressure-sensitive adhesive (e.g., acrylic-based, rubber-based, or silicone-based) and, more particularly, a hot melt pressure-sensitive adhesive.

As was indicated above, the seating adhesive 38/138/238 (and thus also adhesive layers 50/150) can be resealable adhesive, a permanent pressure-sensitive adhesive, and/or an energy-activated permanent adhesive. A suitable resealable adhesive would have some tack but could be opened/closed repeatedly, preferably without leaving residue. For example, candidates for the resealable adhesive would include acrylic, silicone and/or rubber-based pressure-sensitive adhesives. Suitable permanent adhesives could also comprise acrylic, silicone and/or rubber-based pressure-sensitive adhesives, the difference being that the bond strength would be much higher than with a resealable adhesive. Suitable energy-activated permanent adhesives could include, for example, heat-activated adhesives, such as those with an adhesive-forming resin (e.g., urethane resin, polyether resin, acrylic resin, oxyalkylene resin, and/or vinyl resin).

The film-to-film adhesive 40 can be any suitable adhesive, such as a pressure-sensitive adhesive (e.g., acrylic-based, rubber-based, or silicone-based) or a curable-adhesive, such as a UV-curable adhesive. It may be noted that if a UV-curable adhesive is used for the adhesive 40, the film layer 30/56 may need to be transparent.

The release and/or carrier liners 44/144/244 and/or 52/152 can be a sheet of paper or polymeric film having a release coating, such as a silicone release coating. The release liner tab 62 can be made of a similar material.

The vent layer 64 can be made from nylon, polyolefins (e.g., polyethylene, polypropylene, ethylene butylene copolymers), polyurethanes, polyurethane foams, polystyrenes, plasticized polyvinylchlorides, polyesters, polyamides, cotton, or rayon. The vent material can be woven, non-woven, knitted and/or an aperatured (or perforated) film. The material used to fabricate the vent layer 64 should have a porosity or perviousness to accomplish the desired evacuation, for example, at least about 5 cfm (cubic feet per minute), at least about 10 cfm, at least about 15 cfm, at least about 20 cfm and/or at least about 25 cfm with respect to air so that an acceptable level of gas flow can be obtained.

It may be noted that another consideration for material selection with respect to the film layers and/or adhesives may stem from the potential food-related use of the container 10. Specifically, the FDA may dictate that only certain materials and/or adhesives can be used when the possibility of food contact exists. Furthermore, if the container 10 is intended to be used as a freezer bag, the materials should be able to remain intact at the expected freezing temperatures. Likewise, if the container 10 is intended to be heated in, for instance, a microwave, the materials should be able to withstand such thermal conditions. Also, with particular reference to the label-to-wall adhesive layers 36/136/236, an important consideration might be whether the label structures 26/126/226 will be automatically or manually attached to the wall structures 12/112/212.

Although the container and/or label structures have been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A label structure for incorporation into a container having a wall structure defining a receptacle, and an evacuation port in the wall structure through which gas can pass from the receptacle to an outside environment, said label structure comprising:

- a film layer forming a seat platform on which a seating area is located, wherein the film layer that forms the seat platform has an opening;
- a film layer forming a flap platform on which at least one valve flap is located, the at least one valve flap formed by at least one cut in the film layer that forms the flap platform located inward from the outer perimeter, the at least one valve flap having a movable portion defined by the at least one cut and the hinge portion remaining integrally connected to the film layer that forms the valve platform, wherein the movable portion pivots about the hinge portion between a closed position, wherein the valve flap is seated on the seating area to close the opening in the film layer that forms the seat platform, and an open position, wherein the valve flap lifts away from the seating area to open the opening;
- a label-to-wall adhesive on the surface of the film layer forming the seat platform opposite the seating area, which is to be secured to the wall structure of the container;
- a seating adhesive on at least the seating area which holds the valve flap in the closed position; and
- a film-to-film adhesive on the seating adhesive that secures the film layers together, wherein the inner perimeter of the film-to-film adhesive is spaced outwardly from the seating area defined by the at least one valve flap.

2. The label structure as recited in claim 1, wherein a web comprises a carrier liner and a plurality of the label structures attached to the carrier release liner.

3. The label structure of claim 2, wherein the carrier liner is a sheet of paper.

4. The label structure of claim 2, wherein the carrier liner is a polymeric film.

5. The label structure of claim 1, wherein the label structure is mass-produced by a label manufacturer.

6. The label structure of claim 1, wherein the film-to-film adhesive is a pressure-sensitive adhesive.

7. The label structure of claim 1, wherein the film-to-film adhesive is a UV-curable adhesive.

8. The label structure of claim 7, wherein the film layer is transparent.

9. The label structure of claim 1, wherein the container is food-related.

10. The label structure of claim 1, wherein the container is a freezer bag.

11. The label structure of claim 1, wherein the film to film adhesive is patterned.

12. The label structure of claim 1, wherein pressure inside the container results in the open position.

13. A method of making a plurality of containers, comprising the steps of:

- providing a plurality of containers, each of the containers comprising:
  - a wall structure defining a receptacle;
  - an evacuation port in the wall structure through which gas can pass from the receptacle to an outside environment;
- making a plurality of wall structures on the plurality of containers;
- making a web containing a plurality of label structures;
- attaching at least one of the label structures to the wall structures on the plurality of containers, each of the label structures comprising:
  - a film layer forming a seat platform on which a seating area is located, the seating area adjacent the evacuation port, wherein the film layer forming the seat platform includes an outer perimeter and an opening aligned with the evacuation port,
  - a film layer forming a flap platform on which at least one valve flap is located, the at least one valve flap formed by at least one cut in the film layer that forms the flap platform located inward from the outer perimeter, the at least one valve flap having a movable portion defined by the at least one cut and the hinge portion remaining integrally connected to the film layer that forms the valve platform, wherein the movable portion pivots about the hinge portion between a closed position, wherein the valve flap is seated on the seating area to close the evacuation port in the film layer that forms the seat platform, and an open position, wherein the valve flap lifts away from the seating area to open the evacuation port;
  - a label-to-wall adhesive on the surface of the film layer forming the seat platform opposite the seating area, for the attachment of the label structure to the wall structure of the container;
  - a seating adhesive on the seating area which holds a movable portion of the valve flap in the closed position and covers an exterior surface of a film, wherein the seating adhesive having an annular shape extends from the outer perimeter of the film layer to the opening of the film layer, wherein the adhesive is a permanent adhesive and holds the movable portion of the valve flap in the closed position and prevents reopening of the valve flap; and
  - a film-to-film adhesive on the seating adhesive that secures the film layers together, wherein the inner perimeter of the film-to-film adhesive is spaced outwardly from the seating area defined by the at least one valve flap.

14. A method as set forth in claim 1, wherein the web further includes a release liner to which the label structures are temporarily attached, and wherein said step of making the web includes the steps of:

- compiling film layer(s) corresponding the film layer(s) onto the carrier release liner; and
- die-cutting the overall shape of the label structures from the compiled film layers.

15. A method as set forth in claim 1, wherein the step of making the web is performed by a label-manufacturer at a first location, and the wall-making step is performed by a container-manufacturer at second location, and the attaching step is performed by the container-manufacture at the second location.

16. The method of claim 15, wherein the web is made by providing a film layer and printing the label-to-wall adhesive on the film layer.

17. The method of claim 1, wherein the wall structure is made of a thermoplastic material of a blend of thermoplastic materials.

* * * * *